(12) United States Patent
Edwy et al.

(10) Patent No.: US 7,730,096 B2
(45) Date of Patent: Jun. 1, 2010

(54) METHOD AND APPARATUS FOR UTILIZING A DATABASE

(75) Inventors: Tommy Edwy, Marietta, GA (US); Randal Raymond Stark, Morgan Hill, CA (US); Ahdee Quan Chan, Morgan Hill, CA (US); James Leslie King, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 880 days.

(21) Appl. No.: 10/880,874

(22) Filed: Jun. 30, 2004

(65) Prior Publication Data

US 2006/0004793 A1    Jan. 5, 2006

(51) Int. Cl.
*G06F 7/00* (2006.01)
*G06F 17/30* (2006.01)

(52) U.S. Cl. .............. 707/793; 707/795; 707/796; 707/803

(58) Field of Classification Search ............ 707/1, 707/9, 10, 100, 101, 102, 104.1; 705/1
See application file for complete search history.

(56) References Cited

U.S. PATENT DOCUMENTS

| | | | | |
|---|---|---|---|---|
| 5,321,629 A | * | 6/1994 | Shirata et al. | 702/187 |
| 5,657,245 A | * | 8/1997 | Hecht et al. | 700/287 |
| 5,918,191 A | | 6/1999 | Patel | |
| 5,987,474 A | | 11/1999 | Sandifer | |
| 6,557,009 B1 | * | 4/2003 | Singer et al. | 707/104.1 |
| 7,058,154 B1 | * | 6/2006 | Stark et al. | 376/260 |
| 2002/0184043 A1 | * | 12/2002 | Lavorgna et al. | 705/1 |
| 2003/0097288 A1 | * | 5/2003 | Shimomura et al. | 705/8 |
| 2003/0115210 A1 | * | 6/2003 | Leonard et al. | 707/102 |
| 2003/0167150 A1 | * | 9/2003 | Shimura et al. | 702/182 |
| 2003/0200130 A1 | * | 10/2003 | Kall et al. | 705/8 |
| 2004/0102873 A1 | | 5/2004 | Stark et al. | |

FOREIGN PATENT DOCUMENTS

| | | |
|---|---|---|
| DE | 19517162 | 10/1995 |
| EP | 0965897 A1 | 12/1999 |
| EP | 1179798 A2 | 2/2002 |
| EP | 1276058 A2 | 1/2003 |
| EP | 1321864 A2 | 6/2003 |
| WO | WO 00/08577 A1 | 2/2000 |
| WO | WO 01/41024 A1 | 6/2001 |

* cited by examiner

*Primary Examiner*—Don Wong
*Assistant Examiner*—Angela M Lie
(74) *Attorney, Agent, or Firm*—Armstrong Teasdale LLP (57) ABSTRACT

A method for utilizing a database for an inspection of an industrial plant includes downloading a spreadsheet from a remote database containing inspection-related data for the industrial plant, wherein the spreadsheet includes selection lists of inspection data. The method further includes entering inspection data into the spreadsheet utilizing the selection lists and uploading the spreadsheet with the entered inspection data to the remote computer to thereby update the remote database.

19 Claims, 9 Drawing Sheets

| | A | | C | | E | F | G | | I | J | |
|---|---|---|---|---|---|---|---|---|---|---|---|
| | A1 | | Insert Exams | | | | | | | | |
| 1 | Insert Exams | | Limerick 1 | | | | | | | | |
| 2 | Plant Id: | | | | | | | | | | |
| 3 | | | | | | | | | | | |
| 4 | Component | | Weld | | Criteria | Indications | Exam Type | | Insp. Reason | Insp. Date | Comments |
| 5 | CR Guide Tube | | CRGT-1, 02-23 | | Yes | Yes | EVT-1, VT-1 | | NA | MM/DD/YYYY | Test Data |
| 6 | | | | | | | | | | | |
| 7 | | | | | | | | | | | |
| 8 | | | | | | | | | | | |
| 9 | | | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |

Spreadsheet - Limerick 1_20030115
File Edit View Format Tools Data Window Help

Insert Row

METHOD AND APPARATUS FOR UTILIZING A DATABASE

BACKGROUND OF THE INVENTION

This invention relates generally to utilization of databases, and more particularly to methods and apparatus for maintaining and using database records to facilitate inspections of industrial plants such as nuclear power plants.

Regular inspection of nuclear power plants for cracks or other anomalies is performed by teams of qualified inspectors known as "level 3 engineers." The level 3 engineers inspect internal components and denote and quantify items needing attention. These inspections occur on a regular, scheduled basis and include a checklist of items to be inspected. For example, the size and location of cracks that might be discovered are noted. In addition, inspections also occur during any unscheduled outages or at other times that may be deemed appropriate. The results of these inspections are uploaded to a central database (e.g., an ORACLE® database, available from Oracle International Corporation, Redwood City, Calif.) for tracking purposes. Any items that may require follow-up are scheduled for a subsequent inspection. Follow-up inspections and checklists of items to be inspected are based on Nuclear Regulatory Commission or other rules in place that dictate how, when, and what to inspect in a plant and what to do during an inspection.

These databases are effective at scheduling and targeting inspections, but require much manual intervention to use and are not automated. In some cases, processes involving multiple software and/or computer systems are involved that can increase time for both a customer and a level 3 engineer. Previous attempts at addressing these issues involved the use of a number of individuals checking data, ensuring that it is valid and in existence prior to uploading the inspection data to the central database. This approach requires considerable time and is very labor intensive. Moreover, at least one known procedure involves entering inspections into an ORACLE database via a web server one inspection at a time (where, for example, there could be hundreds of exam inspections per outage) or sending information to a number of different resources in a process that can take days to complete.

BRIEF DESCRIPTION OF THE INVENTION

Some configurations of the present invention therefore provide a method for utilizing a database for an inspection of an industrial plant. The method includes downloading a spreadsheet from a remote database containing inspection-related data for the industrial plant, wherein the spreadsheet includes selection lists of inspection data. The method further includes entering inspection data into the spreadsheet utilizing the selection lists and uploading the spreadsheet with the entered inspection data to the remote computer to thereby update the remote database.

Also, some configurations of the present invention provide a method for utilizing a database. The method includes, in response to a request from a local computer, extracting selected data from a database and arranging the data into a spreadsheet file. Macros, specification lists, or both are included in the spreadsheet file to constrain entries into the spreadsheet file. The method further includes transmitting the spreadsheet file with the macros, specification lists, or both to the local computer.

Some configurations of the present invention provide a method for utilizing a database. The method includes receiving a spreadsheet containing inspection related data from a local computer, parsing the spreadsheet to extract the inspection related data, and inserting the inspection related data into the database.

Also, some configurations of the present invention provide a method for utilizing a database. The method includes, in response to a request from a local computer, extracting selected data from a database and arranging the data into a spreadsheet file. Macros, specification lists, or both are included in the spreadsheet file to constrain entries into the spreadsheet file. The method further includes transmitting the spreadsheet file with the macros, specification lists, or both to the local computer, receiving the spreadsheet from a local computer with inspection related data added, parsing the spreadsheet to extract the inspection related data, and inserting the inspection related data into the database.

In yet another aspect, some configurations of the present invention provide a computer network with a database for industrial plant inspections. The network includes a plurality of local computers each having a spreadsheet program and a computer system including a database of inspection data, a query module, a web server, and an update module. The query module is configured to extract data from the database and rearrange the data into a spreadsheet and provide at least one of macros or selection lists to produce locked spreadsheet files. The update module is configured to parse uploaded spreadsheets and enter parsed inspection data into said database. The plurality of local computers are configured to download locked spreadsheet files and upload spreadsheets to the web server via a network.

It will be appreciated that configurations of the present invention provide an integrated data entry point and system that improves productivity and at the same time reduces any residual error probability. The invention enables more efficient and economical utilization of an inspection workforce.

BRIEF DESCRIPTION OF THE DRAWINGS

FIG. 5 is a screenshot of a spreadsheet file opened on a local computer.

DETAILED DESCRIPTION OF THE INVENTION

The descriptions of configurations of the present invention herein refer to certain types of commercially-available software products, including MICROSOFT® EXCEL™ spreadsheets (available from Microsoft Corporation, Redmond, Wash.) and ORACLE databases. These particular software products are suitable for use in the configurations of the present invention described below. However, upon reading the description below and gaining an understanding of the required functionality of the programs used in the example configurations, one of ordinary skill in the art would be able to select other suitable commercial spreadsheets and/or database programs or produce suitable custom versions of such programs.

In some configurations of the present invention, a spreadsheet template (such as an EXCEL template) is provided that accesses an asset management application. As used herein, a "template" is a spreadsheet file that may contain macros and/or selection lists and that is used to prepare a completed spreadsheet, which is not required to be a different file than the template file and may contain the same macros and/or selection lists. For this reason, the terms "template" and "spreadsheet" are used interchangeably here, although it should be recognized that a file downloaded to a local computer is, strictly speaking, a "template" file, whereas a spreadsheet file uploaded to the remote computer by a local computer does not necessarily have to be a "template" file, although it can be.

A reformatting program is provided that accesses the asset management application and generates a spreadsheet template from information stored in the asset management application. The spreadsheet template is downloaded by an inspector, such as a level 3 engineer, for use on his or her local computer, for example, a portable computer. The spreadsheet is used to generate a report from an inspection examination. By providing the inspector with a formatted spreadsheet, the results from the inspection can be checked with macros within or associated with the spreadsheet to ensure that data is entered correctly and completely and that the proper items for an inspection are checked. The local computer is then used to upload the completed spreadsheet into a companion data extraction program that extracts data from the spreadsheets and updates the asset management application with the results of the inspection. Technical effects of the present invention thus include facilitating inspection of an industrial plant such as a nuclear power plant and the reformatting, repackaging, and transmission of data files in formats convenient for use by inspectors and reinsertion into a database.

Figure 1:
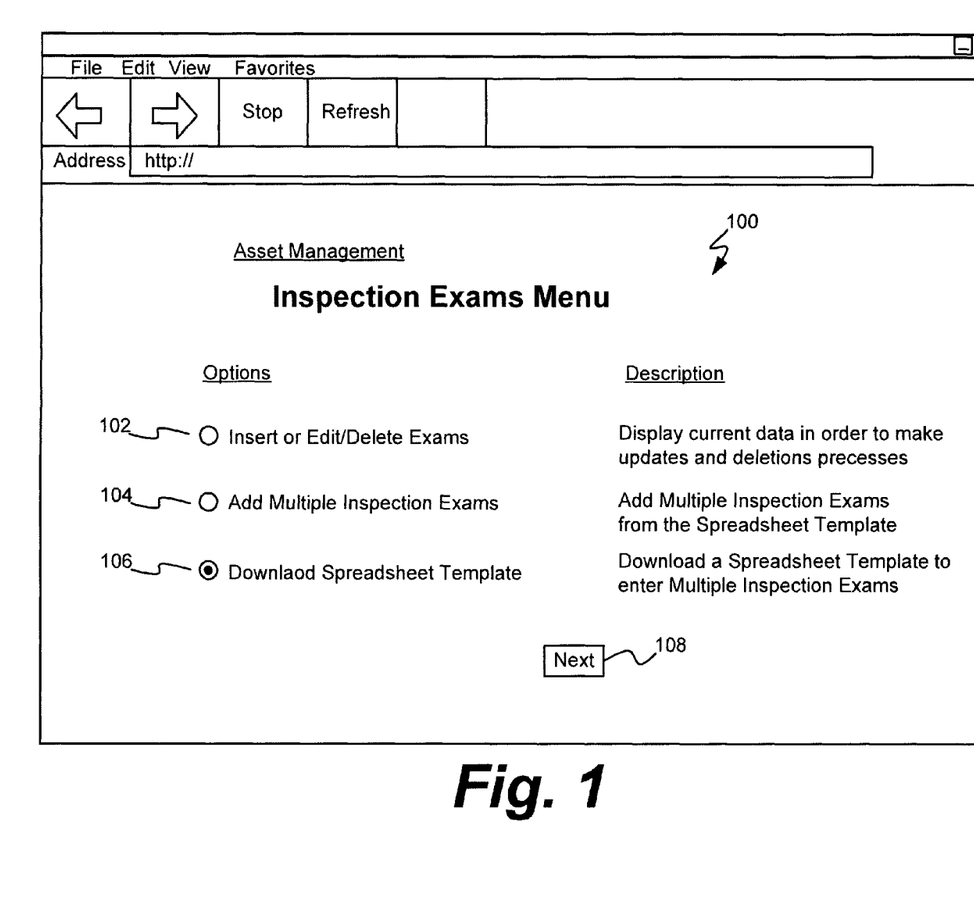
FIG. 1 is a screenshot of an inspection examination menu presented to an inspector in some configurations of the present invention.

More particularly, in some configurations of the present invention, an inspector is presented with an Internet or Intranet menu providing a plurality of options from which he can make a selection. For example, and referring to initial screenshot 100 shown in FIG. 1, a technical effect of the present invention is achieved by an inspector being presented an inspection examination menu. In some configurations, to get to this menu, it is necessary for the inspector to login to a secure web site and navigate to this module. The inspection examination menu allows the inspector to insert, edit or delete exams by selecting item 102, add multiple inspection exams by selecting item 104, or download an EXCEL template by selecting item 106. "Insert, or edit/delete exam" option 102 displays current data to enable the inspector to make updates or deletions of examination procedures. "Add multiple inspection exams" option 104 allows an inspector to upload one or more inspection exams from a local spreadsheet template after the inspector has filled the template with data. "Download EXCEL template" option 106 allows an inspector to download an EXCEL template that allows the entry of the results of one or more inspection exams. In the present case, let us assume that the inspector is ready to make an inspection of one or more plants and therefore selects the "Download EXCEL Template" option 106.

Figure 2:
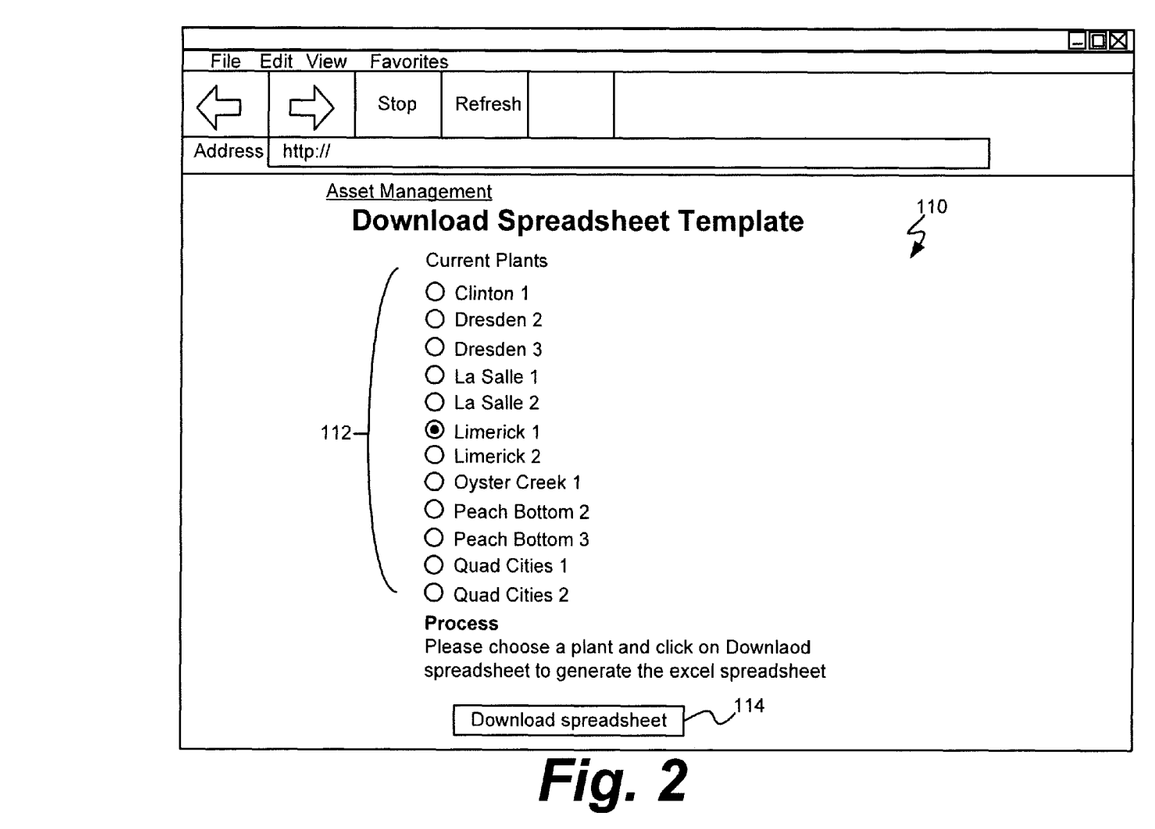
FIG. 2 is a screenshot of a menu of nuclear power plants for which spreadsheet templates can be downloaded.

After selecting the "Download EXCEL template" option 106 and pressing the "Next" button 108, some configurations of the present invention present the inspector with a menu listing a plurality of industrial plants. In some configurations and referring to screenshot 110 of FIG. 2, a menu 112 of nuclear power plants for which spreadsheet templates can be downloaded is provided. The inspector selects one of the plants (for example, "Limerick 1") from menu 112 and then clicks on the "Download Spreadsheet" button 114 to generate and download a spreadsheet to his or her local computer. The exact sequence of steps and/or mouse clicks used to download the spreadsheet may differ depending upon the browsing tool used by the inspector at the local computer and/or the operating system running on the local computer.

Figure 3:
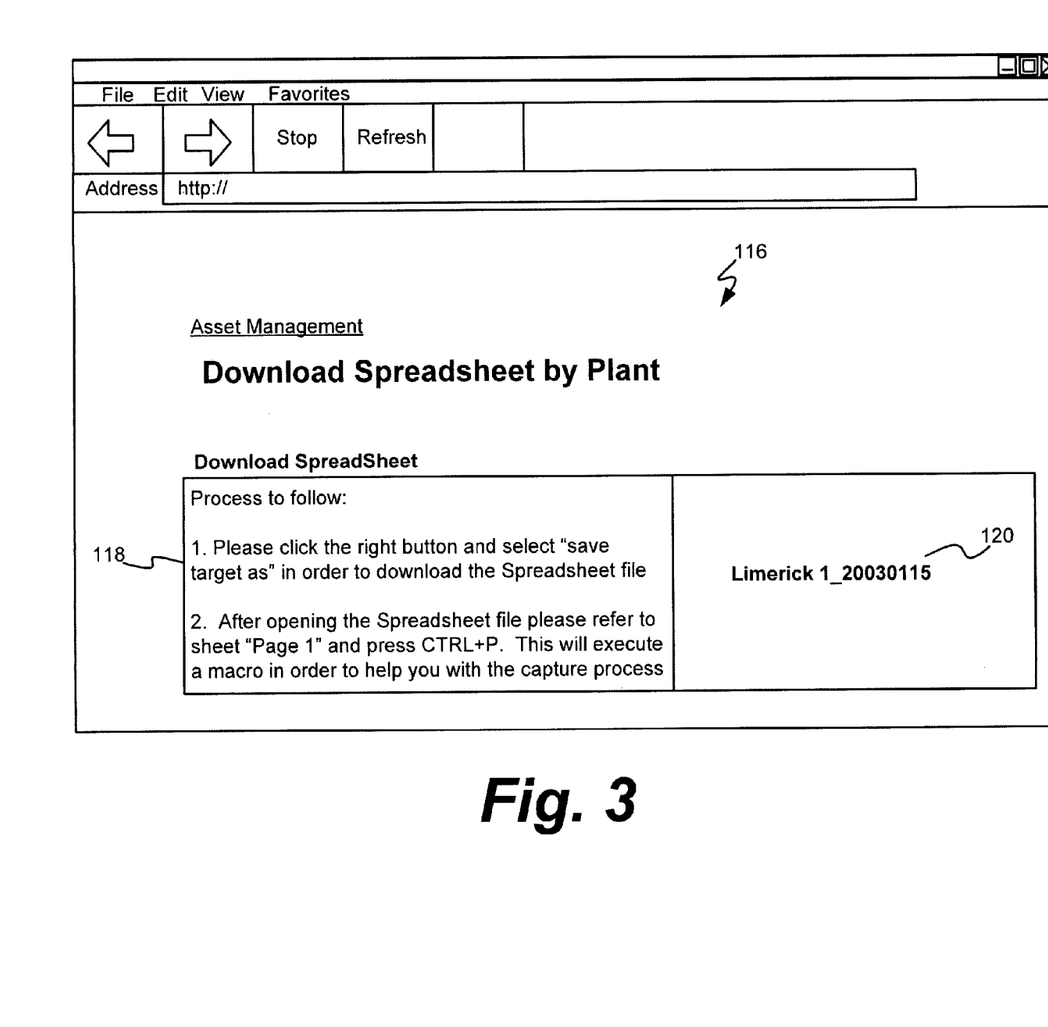
FIG. 3 is a screenshot of a download prompt screen utilized in some configurations of the present invention.

Referring to the download prompt screen 116 illustrated in FIG. 3, the inspector is next prompted to download an EXCEL spreadsheet file and is provided with instructions 118 for setting up a macro to assist in the data entry (or "capture") process. For example, the inspector places his mouse cursor over file name 120 (in this example, "Limerick 1_20030115.xls") and right clicks to download this file to his local computer. Although the CTRL-P key combination is used to execute this macro in the EXCEL spreadsheet, the keystroke(s) and/or mouse clicks and/or other steps used to initiate execution of the macro can be left as a design choice. For example, CTRL-P is used in some applications to send data to a printer. If this key combination is used in this way and reassignment is not possible and/or is not desirable, another key combination or button can be assigned for execution of the macro.

Figure 4:
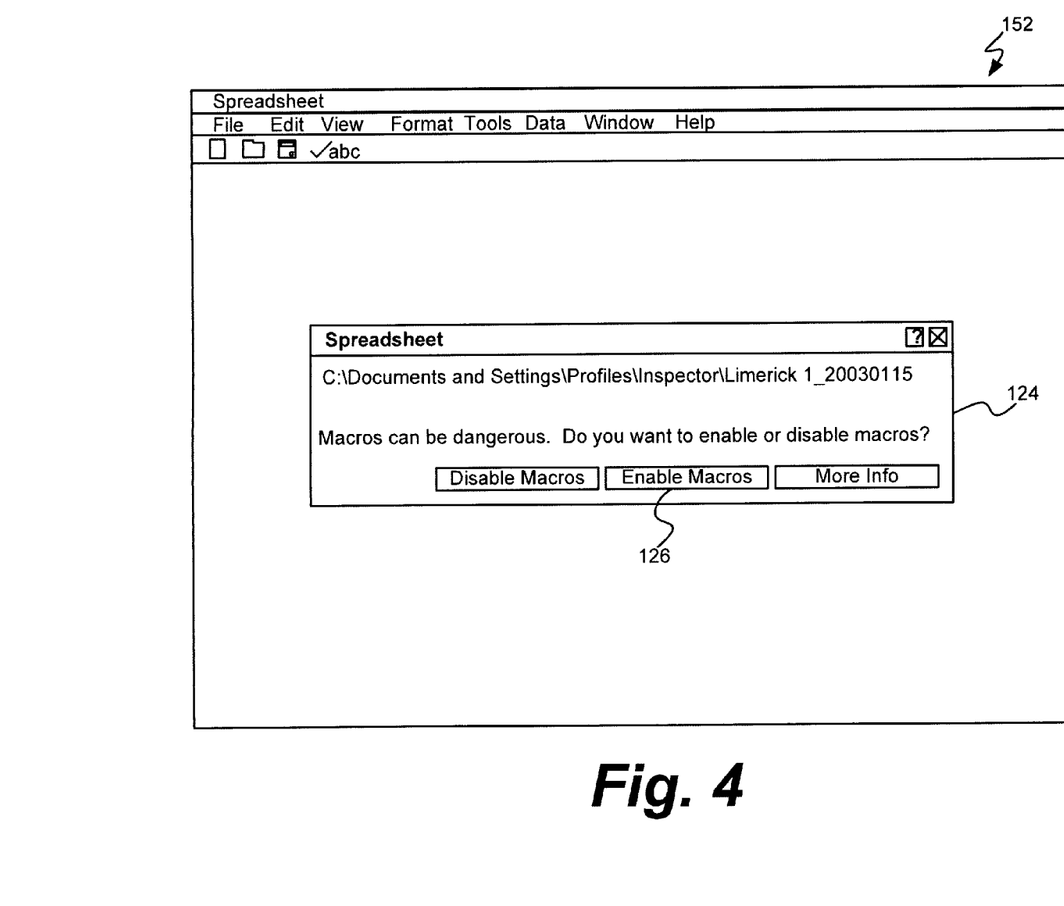
FIG. 4 is a screenshot of a macro warning message displayed when a spreadsheet containing a macro is opened in some configurations of the present invention.

After the file is downloaded to the local computer, it can be opened when the inspector is ready to enter or review inspection data. However, referring to screenshot 122 of FIG. 4, some versions of the MICROSOFT EXCEL spreadsheet program produce a warning 124 when a spreadsheet containing a macro is opened. If this is the case with the spreadsheet program being used for data entry, the button 126 that allows macros to be enabled should be pressed or an equivalent action taken to allow execution of macros. It may be desirable in some configurations to provide appropriate security measures to protect against malicious or unexpected macros while disabling the display of this warning message for legitimate inspection templates.

When the template is loaded, a screen display 128 similar to that shown in FIG. 5 appears. This screen display specifies at 130 the plant to which the inspection data refers and includes a selection list 132 that identifies each component to be inspected. In the case of a nuclear power plant, the component may include a plurality of welds that are to be inspected. The welds for each component are also selected by a selection list 134, wherein weld selection list 134 is keyed to component selection list 132 so that only those welds pertaining to the currently selected component in component selection list 132 can be selected in weld selection list 134. Other inspection data 136 is also keyed to the selection of the weld and the component, and data can be entered to describe the examination type 138, a reason 140 for the inspection, and the inspection date 142. In some instances in which numbers, dates, or other formatted input is required as at 142, the formatting of spreadsheet 128 cells can be constrained by the template such that only data in the correct data format can be entered and/or is within a specified limit. (For example, when a date or a number is required, the template can alert the inspector when an impossible value is entered.) Reminders for future inspections can also be entered in some configurations.

In some configurations, an "insert row" button 144 is provided in the spreadsheet itself. Button 144, when pressed, copies an entry from the formatted selection and data entry area (Row 5 in the example shown in FIG. 5) into an available row below it (e.g., row 6), successively filling in additional rows with inspection data. In some configurations, data in the new row is also locked when "insert row" button 144 is pressed to prevent accidental changes. By entering inspection data in this manner on successive rows, the template ensures that only valid data is entered, and that formatting and data selection is automatically controlled.

Figure 6:
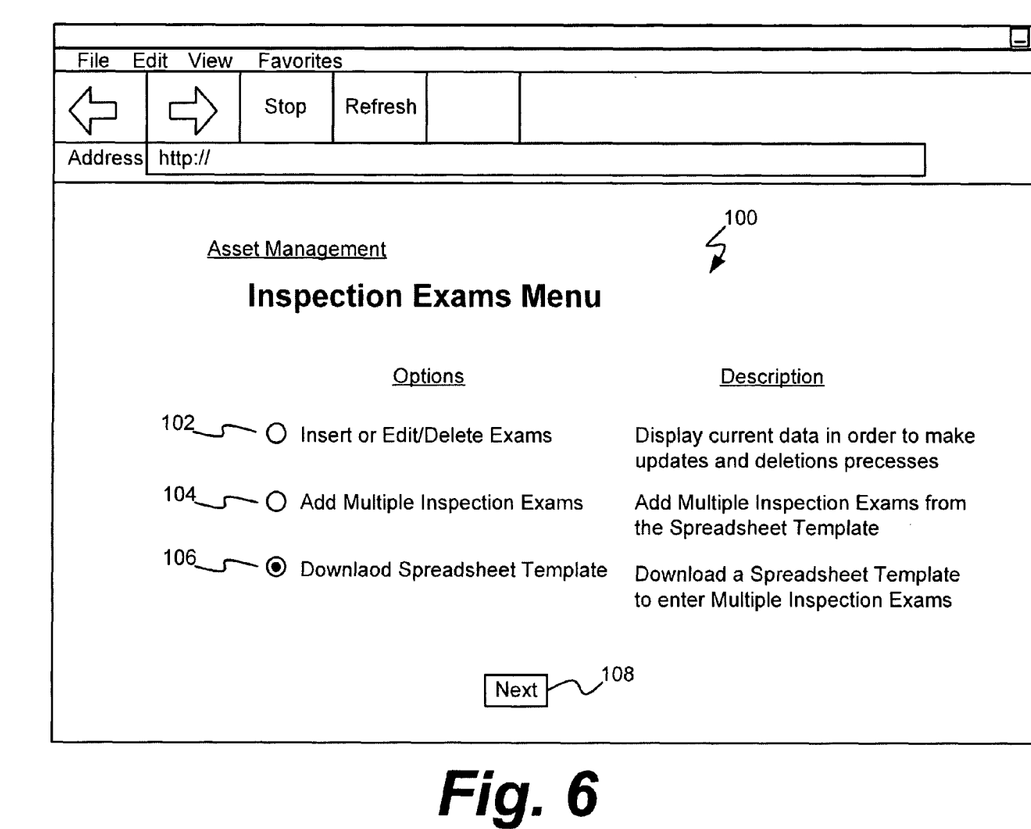
FIG. 6 is a screenshot of the inspection examination menu of FIG. 1 showing the selection of a different menu choice.
Figure 7:
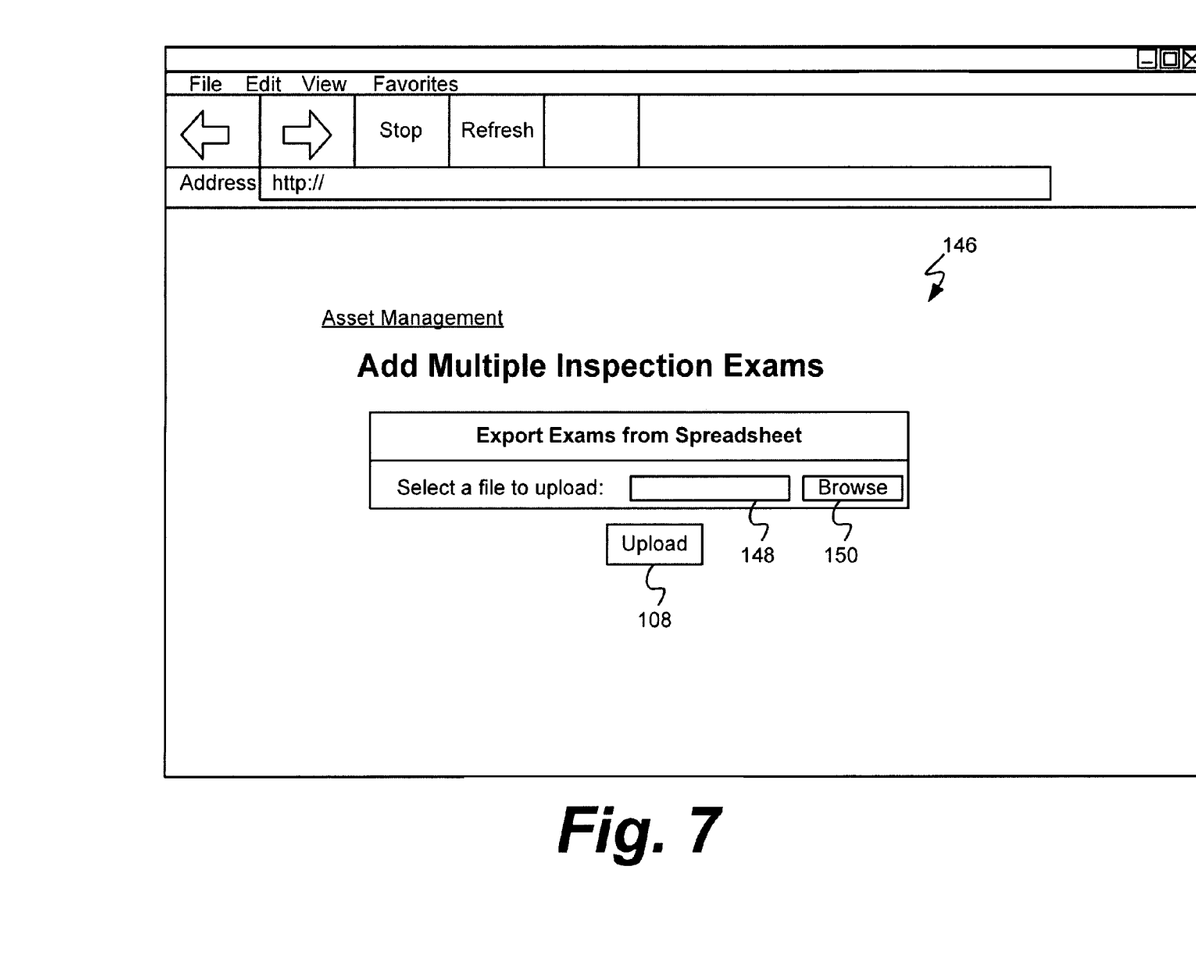
FIG. 7 is a screenshot of an upload screen in which an inspector can specify which spreadsheet file to upload to the remote computer database.
Figure 8:
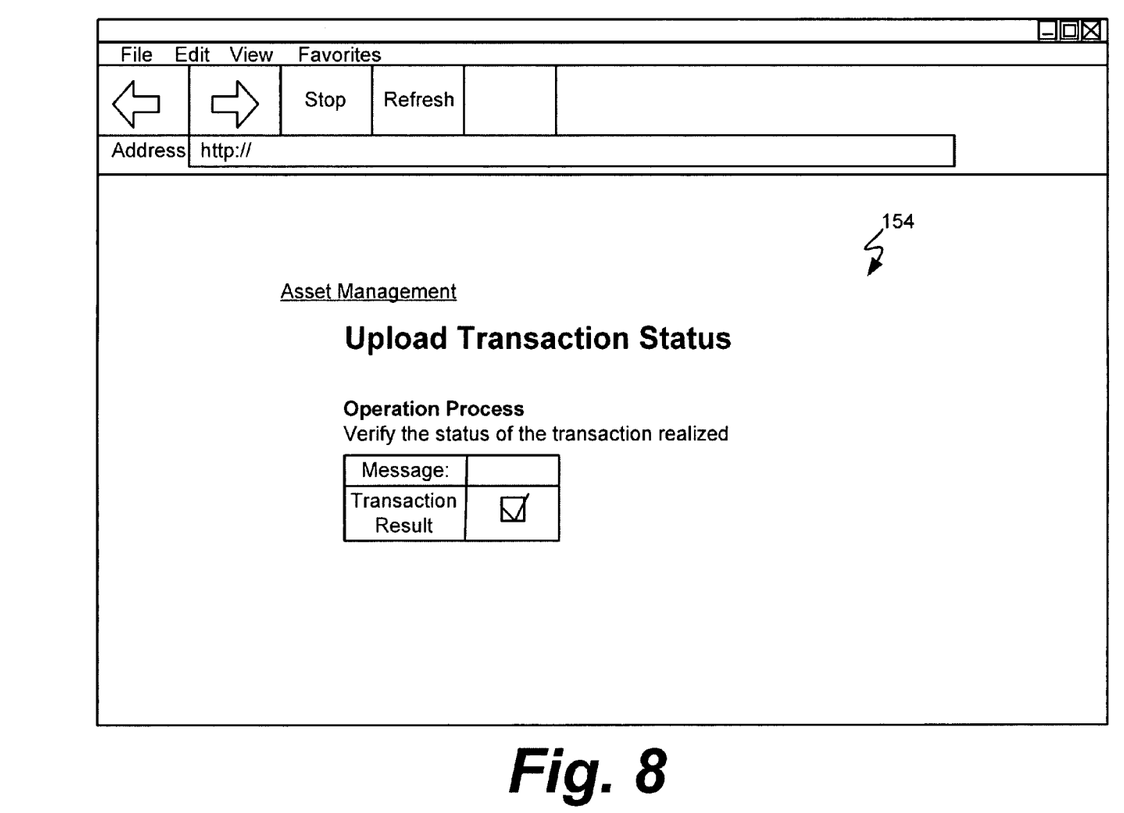
FIG. 8 is an example of an upload verification report provided in some configurations of the present invention.

After the inspection results and/or schedules are entered, the inspector can again access the Internet or Intranet site to upload the examinations. Thus, in some configurations and referring to FIG. 6, the inspector selects the "Add Multiple Inspection Exams" choice 104 from menu 100 and presses "Next" button 108. The inspector is then presented with an upload screen 146 such as that shown in FIG. 7 on which he or she can select a file to upload. In some configurations, this selection can be made by typing in the name of a file in the current folder or directory or the full path to the file in an input box 148, or by clicking on a "browse" button 150 to select the file from a list of files. After a file has been selected, the inspector presses an "upload" button 152 to begin the file upload. A verification 154 is returned as shown in FIG. 8 in some configurations if the file is received without transmission error and with data in a valid format. Additional tests, such as content verification and a test for sufficiency of an inspection can be performed in some other configurations. Providing a verification indication 154 is not essential to the practice of the present invention, but may be highly desirable for many configurations of the present invention.

Figure 9:
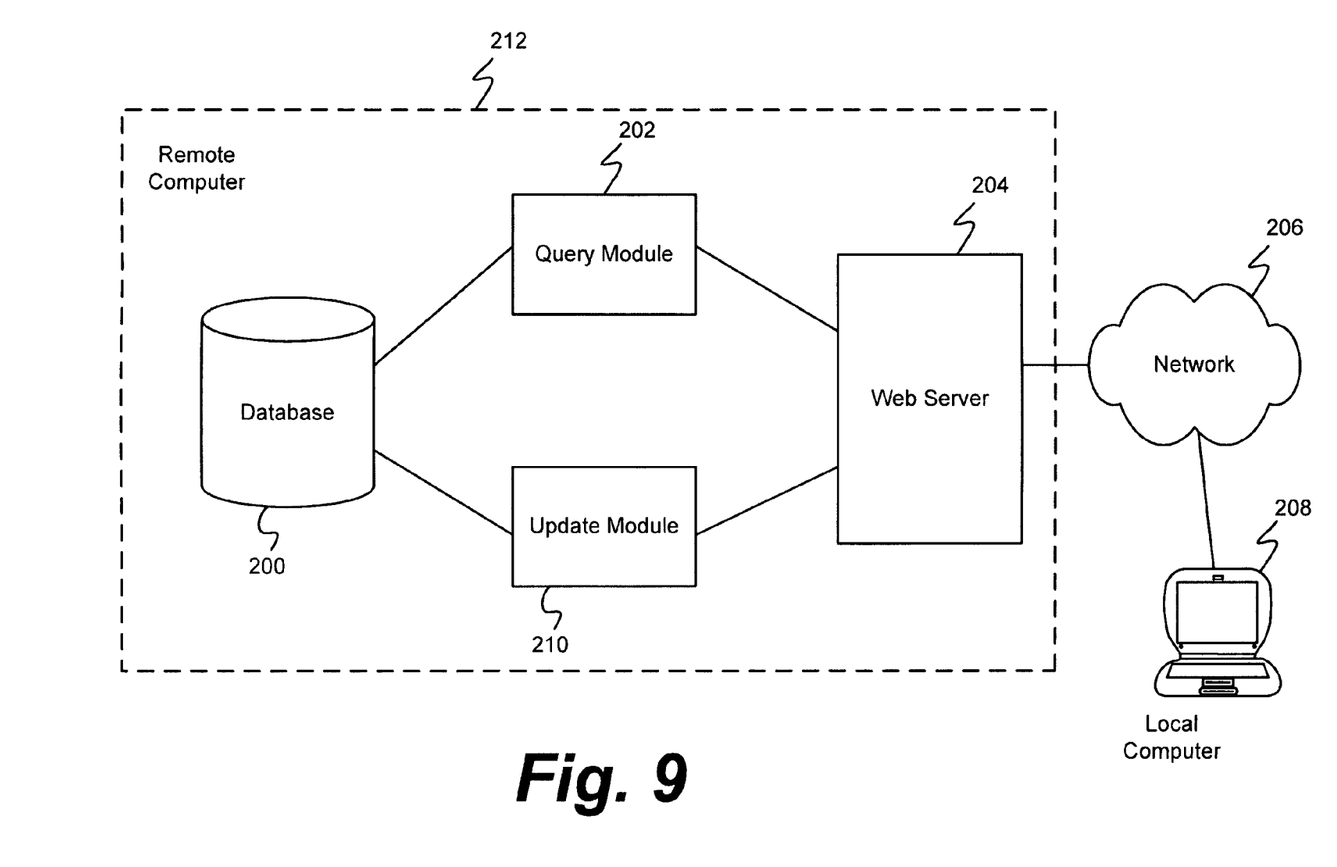
FIG. 9 is a block diagram of a computer network used in some configurations of the present invention.

In some configurations of the present invention and referring to FIG. 9, to provide a spreadsheet template suitable for use by inspectors, a set of inspection requirements is selected for an application. These requirements form the basis for one or more customized utility programs that extract data from a central database 200 and rearrange this data into a template for a spreadsheet. One example of a customized utility program used in some configurations is a query module 202 that extracts data from a previous inspection from central database 200. For example, in some configurations, query module 202 extracts a list of welds and associated inspection data, such as faults, cracks, and further inspection requirements and deadlines from database 200. Query module 202 is activated in response to a command received by a web server 204 from a local computer 208 (i.e., local to a user) over a public or private computer network 206. Query module 202 extracts and rearranges data in database 200, provides any necessary spreadsheet macros and/or selection lists, and saves the data and macros in the form of a database template file that is downloaded to local computer 208. Depending upon the requirements of the inspections to be performed, the form and number of utility programs provided may differ in different configurations of the present invention. However, once the nature and requirements of a utility module are specified for any particular configuration, the task of coding the utility module is within the ordinary level of skill in the art that would be expected of a database programmer and/or applications programmer.

More particularly, in some configurations of the present invention, query module 202 extracts from database 200 a list of items (e.g., welds in a nuclear power plant) for which inspections are required and inserts these items into a spreadsheet template. The template that is downloaded to local computer 208 is "locked" in the sense that an inspector can enter only certain pre-defined notations in the spreadsheet in particular locations of the spreadsheet or must use a drop-down or other type of control to select his responses.

When the inspector has entered his or her responses, the inspector uploads the modified spreadsheet from local computer 208 to an update module 210 via network 206 and web server 204. Update module 210 parses the uploaded spreadsheet and in some configurations also provides consistency, completeness, and/or other checks on the data contained in the uploaded spreadsheet. Unless an error is noted, the inspection data parsed from the uploaded spreadsheet is entered into database 210.

Although FIG. 9 shows web server 204, query module 202, update module 210, and database 200 as running on a single remote computer 212, in other configurations, "remote computer" 212 is more generally a computer system. In addition, although only one local computer 208 is shown, in many configurations, a plurality of local computers 208 are used by different inspectors at different locations to inspect different facilities. Note that, as used herein, a "computer system" refers to one computer or more than one computer or processor cooperatively communicating with one another. Also, the terms "local computer" and "remote computer" are used consistently herein from the viewpoint of an inspector, not the operator of the database. Thus, computer system 212 is always referred to as a "remote computer" and computer 208 is always referred to as a "local computer."

Although the examples presented herein assume that the same person performs the downloading, uploading, and data entry steps described herein, the invention does not require that all of these steps be performed by a single inspector or level 3 engineer or even by the same person. For example, where not forbidden by law, regulation, industry or company practice, one or more assistants or technicians can perform any or all of these steps.

It will be appreciated that configurations of the present invention provide an integrated data entry point and system that improves productivity and at the same time reduces any residual error probability. The invention enables more efficient and economical utilization of an inspection workforce.

While the invention has been described in terms of various specific embodiments, those skilled in the art will recognize that the invention can be practiced with modification within the spirit and scope of the claims.

What is claimed is:

1. A method for utilizing a database for an inspection of an industrial plant, said method comprising:

customizing a set of inspection data to be extracted from a remote database, wherein the customization is based on a user selection of actions related to an inspection of an industrial plant selected by the user;

extracting the inspection data from a previous inspection for the selected industrial plant from the remote database via a query module to generate a customized spreadsheet including selection lists of the defined inspection data relating to the selected actions and the selected industrial plant;

downloading the customized spreadsheet from the remote database to a computer local to the user;

executing the downloaded spreadsheet in a spreadsheet program in the computer local to the user;

entering inspection data, including inspection results, into the downloaded spreadsheet executing in the computer local to the user, utilizing the selection lists to generate a report for the inspection, wherein the selection lists are constrained by the selected actions and the selected industrial plant;

parsing the spreadsheet via an update module to extract the entered inspection data;

providing a future inspection date based on the extracted inspection data and the entered inspection data; and uploading the spreadsheet with the entered inspection data from the update module to the remote computer to thereby update the remote database.

2. A method in accordance with claim 1 wherein said industrial plant is a nuclear power plant, and said inspection data includes a selection list of components to be inspected and a selection list of welds to be inspected, wherein the selection list of welds is constrained by the selection list of components to be inspected.

3. A method in accordance with claim 1 wherein extracting the inspection data includes providing macros configured to constrain inspection data entries entered into the spreadsheet.

4. A method in accordance with claim 1 wherein customizing the set of inspection data includes selecting an industrial plant from a list of industrial plants.

5. A method in accordance with claim 1 wherein said entering inspection data into the spreadsheet utilizing the selection lists comprises entering inspection data for a plurality of examinations.

6. A method in accordance with claim 1 wherein said industrial plant is a nuclear power plant, and further comprising logging into a secure web site, wherein said inspection is performed in response to a shutdown of the nuclear power plant.

7. A method in accordance with claim 6 wherein downloading said spreadsheet includes downloading macros configured to constrain inspection data entries entered into the spreadsheet, and said macros include inspection types.

8. A method for utilizing a database, said method comprising:
    selecting, from a database, an industrial plant to inspect and an action relating to the inspection of the industrial plant selected by the user;
    extracting inspection data from a previous inspection of the industrial plant from the database via a query module for comparison, review, or both;
    generating a spreadsheet including the inspection data extracted from the database, wherein the inspection data is based on the selected industrial plant and the selected action, and wherein the spreadsheet is configured to be readable and at least partially modifiable by a spreadsheet program in a local computer and downloaded to the local computer, where inspection data is entered into the spreadsheet using the spreadsheet program in the local computer;
    receiving the spreadsheet containing inspection data, including inspection results, from the local computer;
    parsing the spreadsheet via an update module to extract the entered inspection data;
    providing a future inspection date based on the extracted inspection data and the entered inspection data; and
    inserting the entered inspection data into the database.

9. A method in accordance with claim 8 wherein the inspection data comprises nuclear plant inspection data, including inspection results.

10. A method in accordance with claim 9 wherein the nuclear plant inspection data includes data relating to welds, the welds being included in a selection list of welds, wherein the selection list of welds is constrained by a selection list of components to be inspected.

11. A method in accordance with claim 8 further comprising checking data in the spreadsheet for at least one of consistency and completeness.

12. A method in accordance with claim 11 further comprising sending a verification report to the local computer.

13. A method for utilizing a database, said method comprising:
    in response to a first request from a local computer, customizing a set of inspection data to extract from a database, wherein the customized set of inspection data is based on a desired inspection-related action and a selection of an industrial plant to be inspected, and wherein the customized set of inspection data includes a list of components to be inspected and a list of welds to be inspected, the list of components to be inspected constrained by the selected at least one industrial plant and the list of welds to be inspected constrained by the list of components to be inspected, and a schedule for inspection of the welds that need inspection in accordance with reminders entered during previous inspections;
    in response to a second request from the local computer, extracting the customized set of inspection data from a previous inspection from the database via a query module;
    arranging the customized set of inspection data into a spreadsheet file;
    including at least one of spreadsheet macros and selection lists in the spreadsheet file to constrain entries into the spreadsheet file, wherein the selection lists are constrained by the industrial plant selected by a user at the local computer;
    transmitting the spreadsheet file to the local computer in a form native to a stand-alone spreadsheet program available on the local computer;
    receiving the spreadsheet from the local computer with inspection data added, including inspection results;
    parsing the spreadsheet via an update module to extract the inspection data;
    providing a future inspection date based on the extracted inspection data and the added inspection data; and
    inserting the inspection into the database.

14. A method in accordance with claim 13 wherein the database includes nuclear power plant inspection data and said inspection data includes data relating to welds at a nuclear power plant.

15. A method in accordance with claim 13 further comprising transmitting a list of industrial plants to said remote computer to solicit said request.

16. A computer network with a database for industrial plant inspections, said network comprising:
    a plurality of local computers each having a spreadsheet program; and
    a computer system including a database of inspection data, a query module, a web server, and an update module;
    wherein said query module is configured to extract previous inspection data from the database via a query module and rearrange the data into a customized spreadsheet and provide at least one of macros or selection lists to produce locked spreadsheet files in a format suitable for said spreadsheet programs of said plurality of local computers, said update module is configured to parse uploaded spreadsheets to which have been added additional inspection data including results of inspections and enter parsed inspection data into said database, provide a future inspection date based on the extracted inspection data and the added inspection data, and said plurality of local computers are configured to download locked spreadsheet files and upload spreadsheets to an update module via said web server and a network, wherein the locked spreadsheet files include a selection list of a predetermined set of industrial plants to be inspected and a selection list of components to be inspected, the selection list of components constrained by the predetermined set of industrial plants.

17. A computer network in accordance with claim 16 wherein said database of inspection data includes data relating to nuclear power plant inspections.

18. A computer network in accordance with claim 17 wherein said data relating to nuclear power plant inspections includes data relating to welds, wherein the data relating to welds is constrained by the selection list of components to be inspected.

19. A computer network in accordance with claim 16 wherein said web server is a secure web server configured to login said local computers.

* * * * *